United States Patent [19]

Shannon

[11] 4,213,339
[45] Jul. 22, 1980

[54] RESERVOIR SENSOR

[75] Inventor: Joseph W. Shannon, Kent, Ohio

[73] Assignee: McNeil Corporation, Akron, Ohio

[21] Appl. No.: 875,201

[22] Filed: Feb. 6, 1978

[51] Int. Cl.² .................. B67D 5/08; G01F 23/24; G06F 15/46
[52] U.S. Cl. ......................... 73/304 R; 222/64; 340/620; 364/556
[58] Field of Search .............. 73/304 R, 308; 222/64, 222/65, 66; 364/556, 557, 569; 340/612, 618, 620

[56] References Cited

U.S. PATENT DOCUMENTS

| | | | |
|---|---|---|---|
| 1,961,893 | 6/1934 | Wadman et al. | 73/304 R |
| 2,385,161 | 9/1945 | Pinkerton | 340/620 X |
| 2,978,143 | 4/1961 | Arnett et al. | 222/64 X |
| 3,370,466 | 2/1968 | Chang | 73/304 R |
| 3,587,078 | 6/1971 | Eichmann | 340/518 |
| 3,598,287 | 8/1971 | de Man | 222/64 |
| 3,775,597 | 11/1973 | November | 364/509 X |
| 3,991,911 | 11/1976 | Shannon et al. | 222/25 |
| 4,017,683 | 4/1977 | Pederson et al. | 340/518 X |

Primary Examiner—Daniel M. Yasich
Attorney, Agent, or Firm—Oldham, Oldham, Hudak & Weber

[57] ABSTRACT

A sensor for determining the presence of a particular volume of fluid within a plurality of reservoirs maintained as a portion of an automatic mixed drink dispenser. Fundamentally, the invention includes electrical contacts maintained within each of the various reservoirs, the reservoirs being aligned into rows and columns to form a matrix. A multiplexing circuit is interconnected to the rows of such reservoirs while a sensing circuit is interconnected to the columns thereof. The addressing of the rows of reservoirs by the multiplexer enables a signal to pass across the contacts and through the beverage maintained within the reservoirs, this signal being sensed by the sensing circuit interconnected between the columns of reservoirs. "Empty" reservoirs, or those having a low beverage level, may be quickly isolated by a determination of the row accessed and the column sensed to result in the failure of a contact to pass a signal.

10 Claims, 4 Drawing Figures

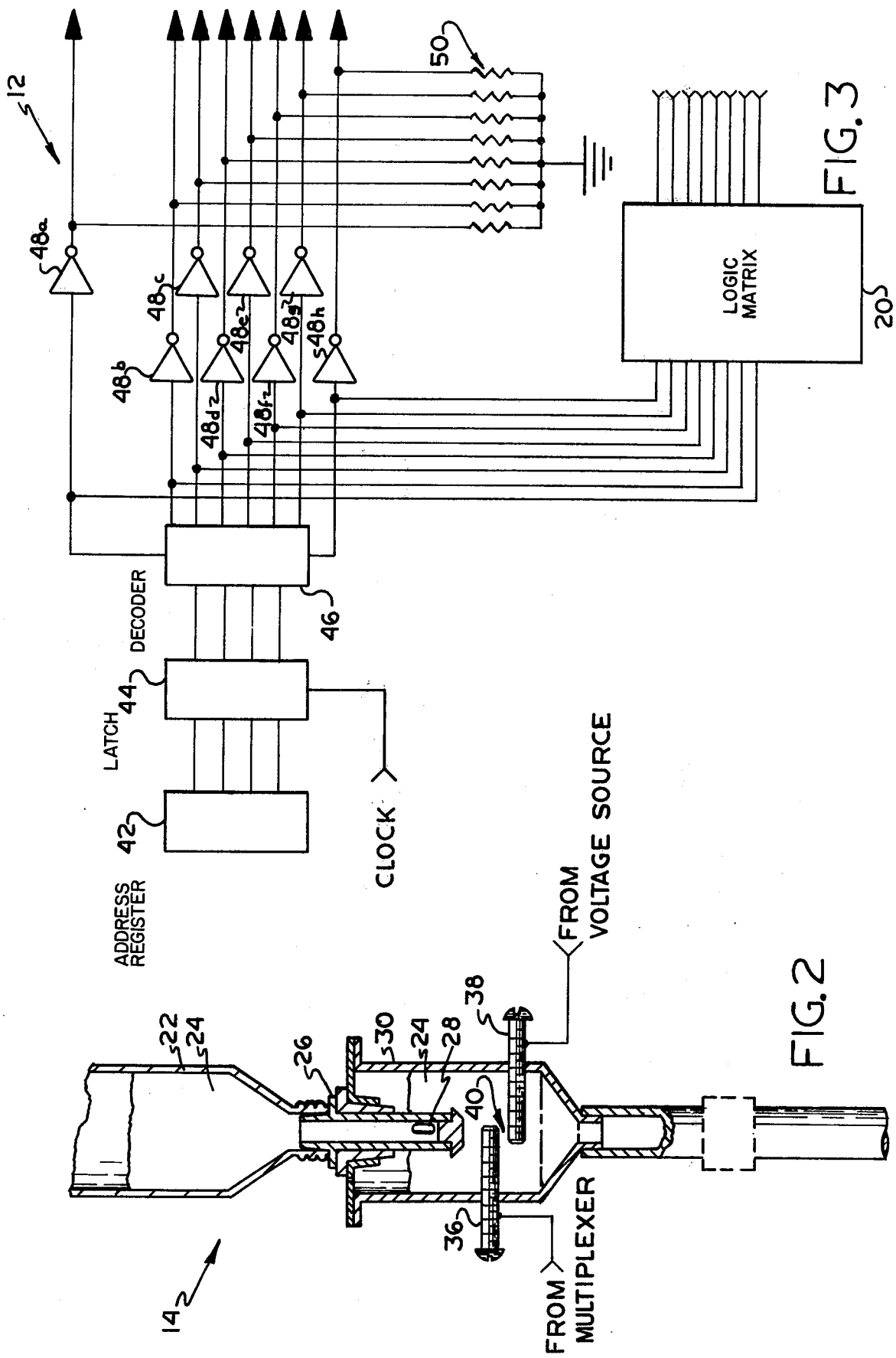

RESERVOIR SENSOR

BACKGROUND OF THE INVENTION

This invention deals in the art of beverage dispensers and is most particularly applicable to automatic mixed drink dispensers wherein central reservoirs supply beverages to one or more remote vending stations. One such system is shown in the prior art in applicant's U.S. Pat. No. 3,991,911, for "AUTOMATIC DRINK DISPENSING APPARATUS HAVING PROGRAMMING MEANS." In this prior art teaching, a plurality of reservoirs are provided to maintain the various components capable of being dispensed, such components being dispensed either singularly or in combination. Each of these reservoirs is provided with a pressure sensor 34, shown in phantom in FIG. 2, which fundamentally comprises a pressure switch. In the prior art, this pressure sensor is mounted within the reservoir itself, or along a conduit leading therefrom, in such a manner that when the liquid is at least at a minimum level within the reservoir there is sufficient pressure against the switch to produce an output indicative of that fact. Similarly, when the liquid falls below a minimum level, insufficient pressure bears against the switch 34 such that an output is produced indicating that the reservoir is "empty." In the aforementioned prior art patent, lamps are associated with each of the various reservoirs, the lamps being illuminated by their associated sensor switch when their respective reservoirs are "empty."

While applicant has found the sensor switch 34 to be adequate for purposes of advising a bartender or other user as to the presence of an "empty" reservoir, it has also been found that such sensors are susceptible to false readings. Since the reservoirs of the drink dispensers are generally of a small volume, the variation of pressure between a reservoir maintaining sufficient beverage and one which is "empty" is small. With the sensor switches 34 being mechanical in nature and pressure-actuated, it has been found that the sensitivity thereof is often not sufficient to guard against false readings. On occasion, it has been found that reservoirs maintaining sufficient beverage have resulted in "empty" signals while, on the contrary, reservoirs having an insufficient amount of beverage have failed to render an "empty" signal. The problems are inherently due to the restricted sensitivity achievable with a pressure-actuated electromechanical switch.

OBJECTS OF THE INVENTION

In light of the foregoing, it is an object of the instant invention to present a reservoir sensor which is totally electronic in nature, overcoming the drawbacks associated with the mechanical apparatus of the prior art.

Yet another object of the invention is to present a reservoir sensor which, while electronic in nature, is only intermittently actuated and thus operated on a low duty cycle.

Still another object of the invention is to present a reservoir sensor which is simplistic in construction, relatively inexpensive in cost, easily conducive to implementation with state-of-the-art devices, and more reliable than sensors heretofore known in the art.

SUMMARY OF THE INVENTION

The foregoing objects and other objects which will become apparent as the detailed description proceeds are achieved by apparatus for sensing the presence of a particular level of fluid within a plurality of reservoirs, comprising: first means maintained within each of the reservoirs for passing signals through the fluid at the particular level; second means connected to said first means for selectively enabling the passing of signals through the fluid of certain of the reservoirs; and sensing means connected to said first means for producing an output indicating the capability of said certain of the reservoirs to pass said signals.

DESCRIPTION OF THE DRAWINGS

For a complete understanding of the objects, techniques, and structure of the invention, reference should be had to the following detailed description and accompanying drawings wherein:

FIG. 2 is a cross-sectional view of a beverage reservoir utilizing the sensor of the invention;

FIG. 3 is a schematic diagram of the address multiplexer of the sensor; and

DETAILED DESCRIPTION OF THE PREFERRED EMBODIMENT

While the invention herein is presented with respect to a beverage dispenser having sixty-four beverage reservoirs, it is to be understood that the same comprises but a preferred embodiment of the invention, and that the concept of the invention is applicable to any number of such reservoirs.

Figure 1:
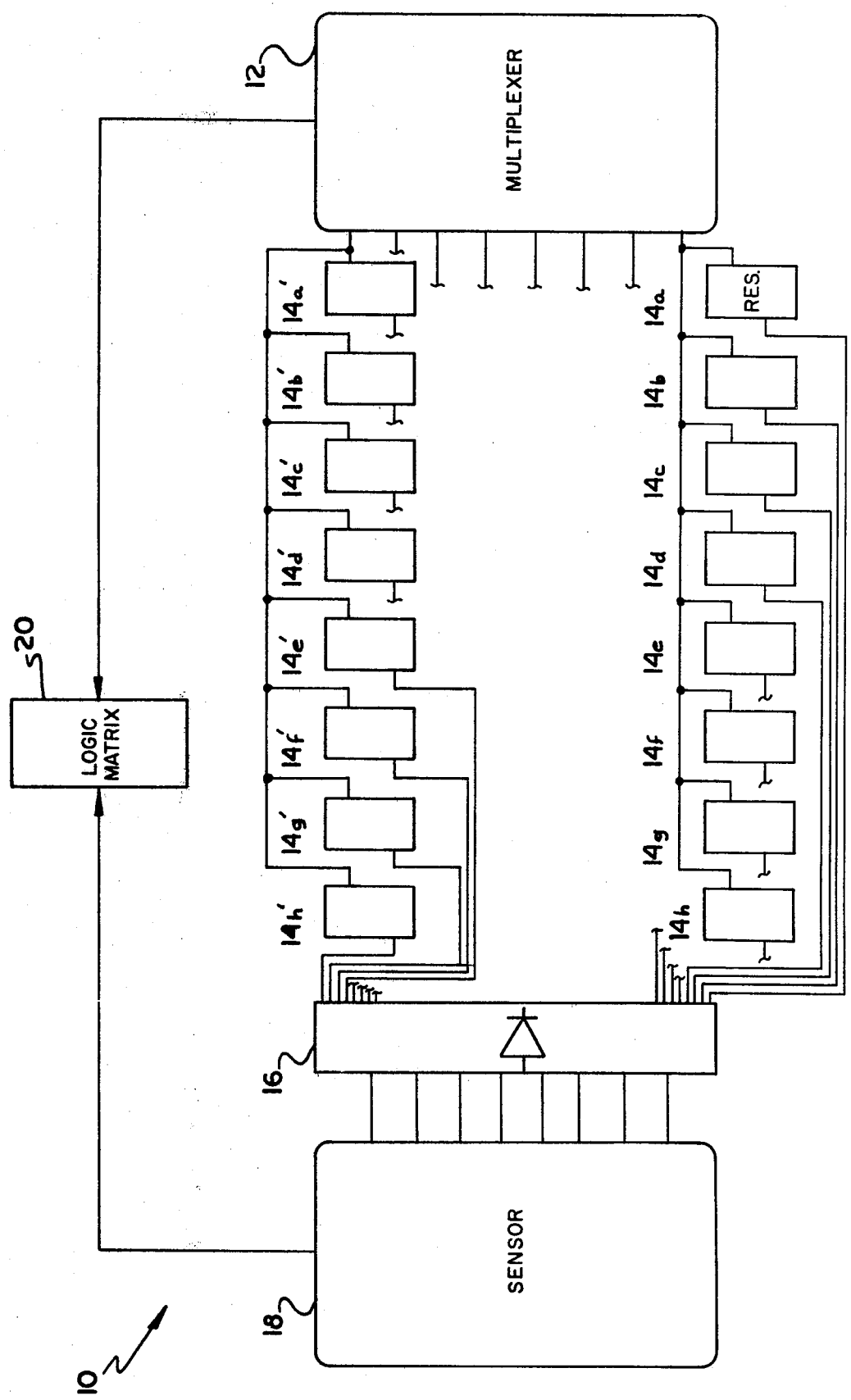
FIG. 1 is a functional block diagram of the reservoir sensor of the invention.

Referring now to the drawings and more particularly FIG. 1, it can be seen that a sensing system is designated generally by the numeral 10. The system includes an address multiplexer 12 having eight address lines capable of presenting outputs therefrom. Each address line is connected to a plurality of reservoir units, in this case eight. A first output line is connected in common to reservoir units 14a–14h, while the last output line is connected to reservoir units 14a′–14h′. Of course, in the embodiment presented, forty-eight additional reservoir units are included, each of the remaining six output lines of the address multiplexer 12 being connected to eight of such reservoir units. It will be noted that each of the outputs of the address multiplexer 12 is connected to eight reservoir units comprising a row in a matrix of reservoir units.

The voltage source and sensor 18 is also provided in interconnection with the reservoir units 14, with each of the eight outputs of the unit 18 being connected to eight such reservoir units comprising a column. That is, one output is connected to the "a" reservoir units, one to the "b" reservoir units, and so forth. The interconnection between the outputs of the unit 18 and the columns of reservoir units 14 is achieved through a diode network 16 which isolates the outputs of the units 14 within a column from each other. As will be apparent hereinafter, the address multiplexer 12 addresses or accesses a row of reservoir units while the voltage source and sensor unit 18 energizes, and senses outputs from sensors associated with, columns of such reservoir units.

A logic matrix 20 is provided in interconnection between the multiplexer 12 and unit 18 for determining, in a manner to be discussed hereinafter, the particular reservoir unit producing an "empty" signal, such determination being made on the basis of the row of reservoir units accessed by the multiplexer 12 and the column of such units emanating an "empty" signal as sensed by the unit 18.

With reference now to FIG. 2, it can be seen that a typical reservoir unit is designated generally by the numeral 14. Such a unit includes a bottle 22, as purchased from a distributor, such bottle maintaining therein a beverage or other fluid 24. A sleeve 26 is received within the mouth of the bottle 22 and makes communication with the reservoir 30 via the opening 28. A conduit 32 passes from the reservoir 30 to a dispensing pump (not shown). In the prior art discussed above, a pressure-actuated sensor 34 was maintained within the conduit 32 to function in the previously described manner. For a complete understanding of the reservoir unit, reference should be had to the aforementioned U.S. Pat. No. 3,991,911.

As part and parcel of the instant invention, each of the reservoir units 14 includes two stainless steel screws 36,38 in offset, diametrically opposed relationship to each other, and passing through the side walls of the reservoir 30 and into the reservoir itself. As shown, the screw 36 is connected to the multiplexer 12, while the screw 38 is connected to the voltage source and sensor unit 18 through the diode network 16. As discussed above, each of the reservoirs is uniquely and exclusively connected to one of the output lines of the multiplexer 12 and one of the output lines of the unit 18 to form a reservoir matrix.

With the screws 36,38 being offset with respect to each other, and with the reservoir 30 maintaining the fluid 24 therein, an electrical path is present and most particularly available in the area 40 existing between the screws 36,38. Since the direct path between the screws establishes, for all intents and purposes, the conductive path between the screws 36,38, the characteristic conductivity therebetween is a function of the diameter of the screws 36,38, the spacing of the offset and the overlapping therebetween, and the conductivity characteristic of the beverage or fluid 24. The resistance or the conductivity of the circuit path 40 may be determined from the formula $R = \rho l / A$, where R is the resistance of the path, $\rho$ is the resistivity of the fluid 24, l is the gap between the screws 36,38 as determined by the offset, and A is the cross-sectional area of the circuit path 40. Of course, in this situation l and A are complex functions, taking into consideration the fringing effect of the conductive path between the screws 36,38. It will obviously be appreciated that for a fixed voltage potential existing between the screws 36,38, the overlap and spacing between the screws will need to be determined and selected with respect to the resistivity of the fluid 24. Suffice it to say that it is well within the capabilities of one skilled in the art to determine such structural characteristics.

With reference now to FIG. 3, it can be seen that the address multiplexer 12 includes an address register 42 which may simply be an independent register loaded by means of a voltage source and toggle switches. More preferably, the register 42 is part and parcel of a microprocessor control unit. In any event, the address register 42 having four outputs, is capable of addressing, in binary form, the eight output lines of the multiplexer 12 as shown in FIG. 1. While three such lines would be sufficient to perform such a task, a fourth line is added which may present a state indicating that no address is being selected. Receiving the outputs of the register 42 is a latch 44, which would comprise nothing more than four D-type flip-flops enabled by a clock, as shown. Again, the clock may be provided in any suitable fashion but is most desirably provided as part and parcel of a microprocessor system. In any event, on a clock impulse to the latch 44, the four outputs thereof respectively latch to the states of the four outputs of the register 42 such that in the case of a microprocessor, the microprocessor may advance to the performance of other functions. The outputs of the latch 44 are passed to a one-of-eight decoder 46 which, in the standard fashion, decodes the outputs of the latch 44 to energize one of the eight output lines thereof. The eight output lines are respectively connected to associated inverters 48a-48h, such that an energized output of the decoder 46 will result in a low voltage output from the associated inverter 48. Consequently, the outputs of the inverters 48 are normally at a high or logic one state. Loading the outputs of the inverters are respective associated resistors 50 which are tied to ground, as shown. The outputs of each of the inverters 48 are passed to the screws 36 of the eight reservoir units 14 of their associated row, as mentioned hereinabove. Consequently, except when the associated inverter 48 is accessed by the decoder 46, a positive voltage level is maintained upon the associated screws 36,38.

As is also shown in FIG. 3, the outputs of the decoder 46 are passed to the logic matrix 20, advising that matrix as to the energization or accessing of a particular row of the reservoir matrix.

Figure 4:
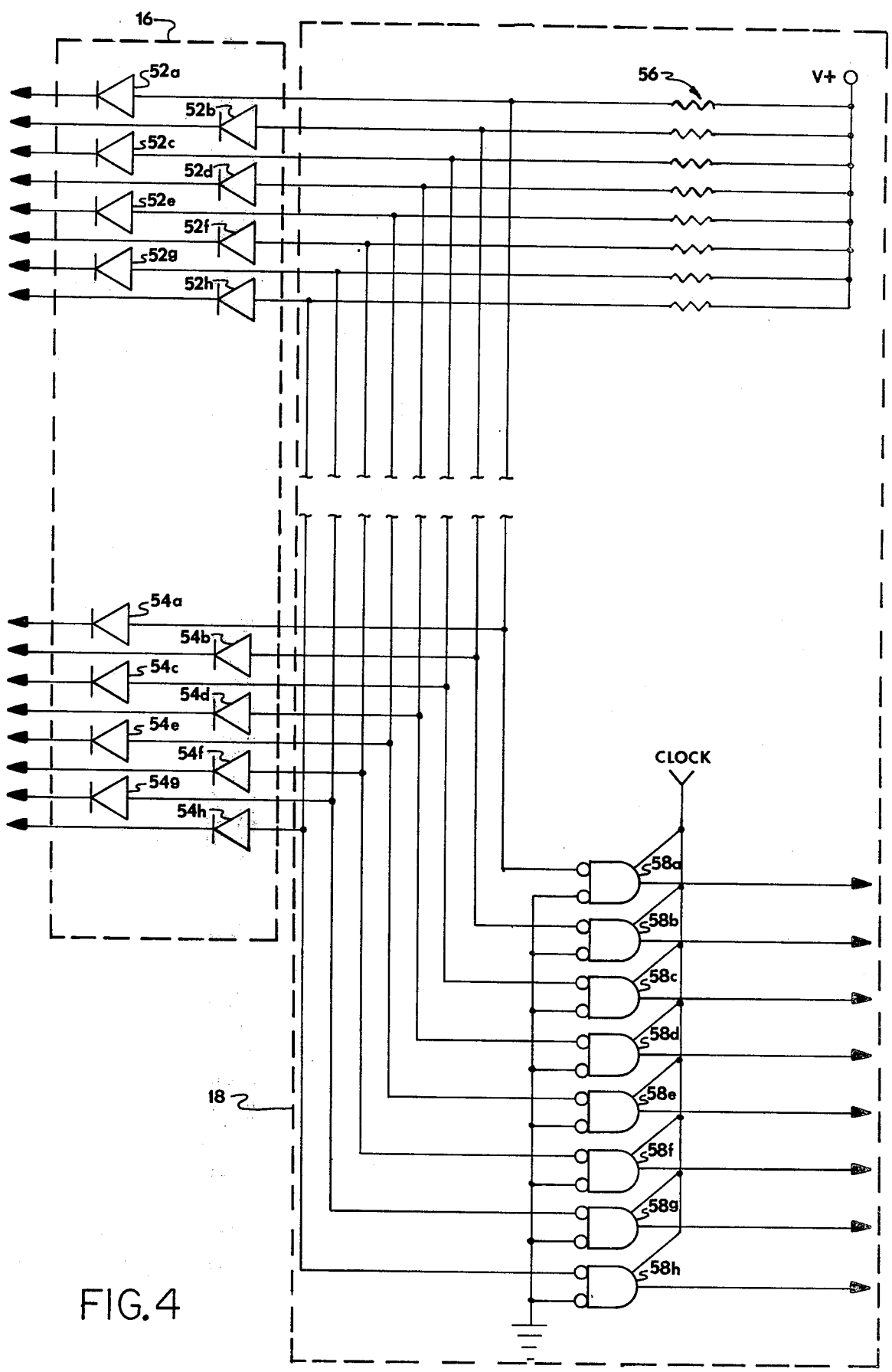
FIG. 4 is a schematic diagram of the voltage source and sensor of the invention.

FIG. 4 shows the detailed schematic of the diode network 16 and the voltage source and sensor unit 18. For the embodiment under consideration, the network 16 includes eight sets of eight diodes each. For purposes of simplicity only two such sets are shown: the set comprising diodes 52a-52h, and that comprising diodes 54a-54h. It will be noted that corresponding diodes of each of the sets share a common resistor 56 connected to a forward biasing voltage source of the unit 18. Further, corresponding diodes of each of the sets are interconnected to an input of an associated tri-state gate 58a-58h of the unit 18. The other inputs of the gates 58 are connected to ground as shown, such that when the gates 58 are accessed via a clock, the outputs thereof are indicative of the inputs connected to the associated diodes. Again, the clock may be provided in any suitable manner, but it is preferable that the same be part and parcel of a microprocessor system controlling the associated beverage dispenser.

It will be appreciated that the voltage source and sensor unit 8 effectively comprises eight output lines to the reservoir matrix. These eight lines each have associated therewith one of the resistors 56 tied to a positive voltage source, and a tri-state threshold detector or gate 58. The diodes of the network 16 are used for purposes of isolating the reservoir units, within a column of the reservoir matrix, from each other. As can be seen, the inputs to the diodes 52a-54a are common, while the outputs thereof are connected to associated screws 38 of the reservoirs 14a-14a'. Similarly, the inputs to the diodes 52h-54h are connected in common, while the outputs thereof are respectively connected to the screws 38 of the reservoirs maintained in the column comprising 14h-14h'.

In operation, rows of reservoir units within the reservoir matrix are mutually exclusively accessed via the elements 42-48 as discussed above. If the beverage or fluid 24 maintained within the respective reservoirs is at a sufficient level to complete the circuit path 40 between the screws 36,38, current passes from the positive voltage source, through the resistors 56 and respective diodes 52-54, and to ground via the resistors 50. Consequently, if the reservoirs of the row are all full, a voltage drop is experienced at the input of the associated tri-state threshold detectors 58, with an appropriate output being produced therefrom. If, however, one of the reservoir units maintains beverage below the level sufficient to complete the circuit path 40 between the screws 36,38, no such voltage drop will occur and the output of the associated tri-state device 58 will evidence that fact, indicating that the reservoir uniquely located in that column and at the row accessed by the multiplexer 12, is "empty."

The outputs of the threshold detectors 58 are passed to the logic matrix 20, one threshold detector 58 being associated with each column of the reservoir matrix. The logic matrix 20 may be nothing more than a plurality of AND gates interconnected between the row and column lines respectively connected thereto from the circuits 12,18. In such a circuit, there would be one AND gate associated with each of the reservoir units of the reservoir matrix, an output from an AND gate indicating that the associated reservoir unit is "empty." Of course, the logic matrix 20 could take on any of numerous configurations as would be well within the capabilities of one skilled in the art to conceive. In any event, the circuit 20 may decode the outputs of the decoder 46 and threshold detectors 58 to present an "empty" signal isolating the reservoir unit 14 having a low beverage level.

It should be appreciated with the foregoing invention that the address multiplexer 12 may be repetitively stepped through the various rows in a quick impulse, low duty cycle fashion such that the beverage 24 within the reservoir 30 will conduct current for very brief time periods, alleviating any problems of decomposition or degradation of the fluid or beverage. It will also be noted that the positioning of the screws 36,38 in diametrically opposed relationship to each other assures that the beverage maintained upon the inner walls of the reservoir 30 will not provide a circuit path between the screws 36,38 to produce a false reading when the reservoir is indeed "empty." This results from the fact that it is unlikely that beverage would follow such a long path about the inner circumference of the reservoir and, further, from the fact that the resistance between two such points would be far greater than that across the circuit path 40. Hence, an "empty" signal would still result.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. The improvement, in apparatus for sensing the presence of a particular level of fluid within each of a plurality of reservoirs, each of the reservoirs having an inlet and an outlet, comprising:
   a pair of electrical contacts maintained within each of the reservoirs at the particular level and in adjustable diametrically opposed spaced relationship to each other for passing signals through the fluid, said spaced relationship determining the resistance of an electrical path between each said pair of electrical contacts at the particular level;
   first means connected to said electrical contacts selectively applying electrical signals thereto for enabling the passing of said signals through the fluid of certain of the reservoirs, and
   sensing means connected to said electrical contacts for sensing the passing of said signals and thereupon producing an output indicating the presence of the fluid between said pair of contacts.

2. The apparatus according to claim 1 wherein said first means comprises a multiplexing circuit sequentially and mutually exclusively accessing first groups of said electrical contacts to enable the passing of said signals.

3. The apparatus according to claim 2 wherein said multiplexing circuit comprises a register interconnected with a decoder, said decoder having an output connected to each of said first groups of said electrical contacts.

4. The apparatus according to claim 2 wherein said sensing means comprises a threshold detector connected to each of a plurality of second groups of said electrical contacts.

5. The apparatus according to claim 4 wherein each of said second groups includes a pair of said electrical contacts from each of said first groups.

6. In a beverage dispenser, the improvement comprising:
   a plurality of reservoirs maintaining beverage therein, said reservoirs each having an inlet and an outlet and forming a matrix of rows and columns;
   a set of electrical contacts maintained within each of said reservoirs in adjustable opposed spaced relationship with each other, the spacing of said electrical contacts establishing, for a particular beverage, the resistance of a conductive path therebetween;
   addressing means interconnecting said electrical contacts within the same rows of said matrix for enabling said electrical contacts to pass electrical signals; and
   sensing means interconnecting said electrical contacts within the same columns of said matrix for sensing said electrical signals passed by said electrical contacts.

7. The improvement according to claim 6 wherein said electrical contacts are maintained within said reservoirs in diametrically opposed relationship to each other.

8. The improvement according to claim 6 wherein said sensing means comprises a threshold detector for each said column, said threshold detector being connected to each of said electrical contacts within an associated column.

9. The improvement according to claim 6 wherein said addressing means comprises a multiplexer simultaneously enabling all of said electrical contacts in a row, sequentially for each row.

10. The improvement according to claim 9 which further includes logic means interposed between said addressing means and sensing means for determining the absence of a particular amount of beverage within a given reservoir as a function of the row of electrical contacts enabled by said addressing means to pass electrical signals and those contacts not passing such electrical signals as sensed by said sensing means.

* * * * *